Aug. 21, 1962    J. A. MILNES    3,049,947
WATER-COOLED MANDREL
Filed May 5, 1959
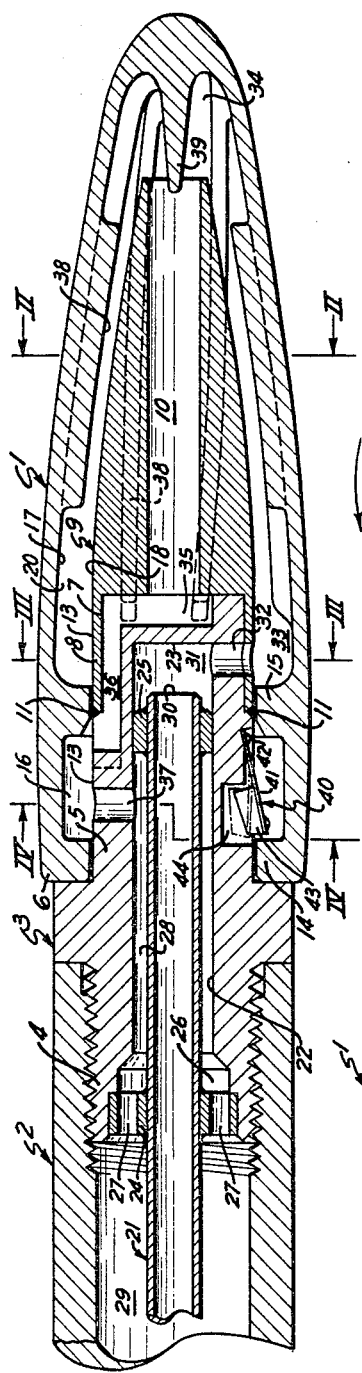
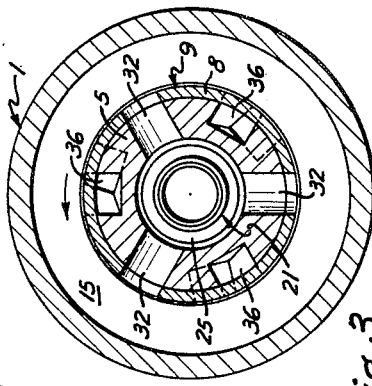
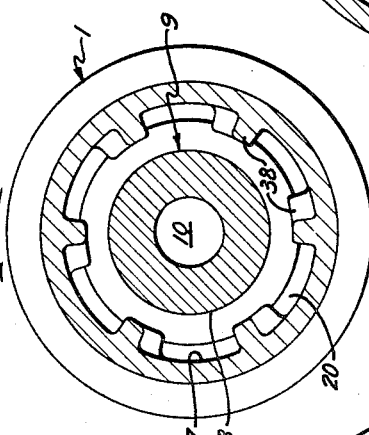
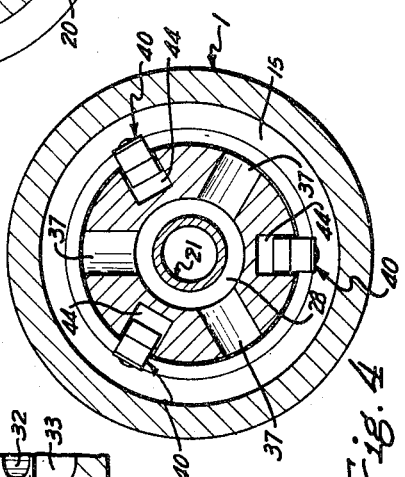
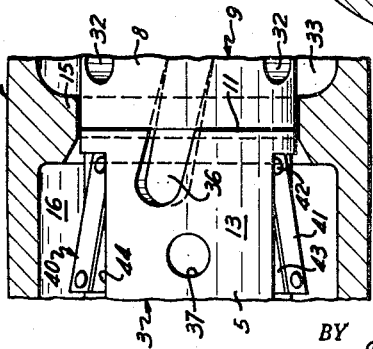
INVENTOR.
JAMES ARTHUR MILNES
BY Donald G. Dalton
ATTORNEY

United States Patent Office 3,049,947
Patented Aug. 21, 1962

3,049,947
WATER-COOLED MANDREL
James Arthur Milnes, Frisco, Pa.
(Mounted Rte. 11, Ellwood City, Pa.)
Filed May 5, 1959, Ser. No. 811,089
7 Claims. (Cl. 78—103)

This invention relates to the manufacture of seamless steel tubes and, as indicated, to a water-cooled mandrel of improved construction for use in their fabrication.

Seamless steel tubes and pipes are fabricated by working heated tubular blanks over mandrels that are commonly solid steel castings or forgings and are supported by a bar cap on the end of a hollow water-cooled mandrel bar. Such mandrels have a shape according to the fabricating operation, for example, piercing, expanding, or reeling, that is being performed on the steel stock. By reason of the temperature of the blank and the heat generated as the result of working it to reduce its wall thickness, the mandrels are heated to a temperature approaching their melting point and must be removed for cooling at the end of each working pass. This is done manually by a "plugger" who removes the heated mandrel and replaces it with a cool one taken from a reserve supply in a water-bosh. While different forms of hollow water-cooled mandrels have been proposed for the purpose of eliminating replacement operations of this character, such proposals have not proved entirely satisfactory, and the use of solid mandrels has continued.

This invention accordingly has as one of its principal objects the provision of a water-cooled mandrel of improved construction that may be used in place of solid mandrels and will eliminate the necessity of their replacement at the end of each working pass.

Other objects and advantages of the invention will become apparent from the following description and the accompanying drawings, in which:

FIGURE 1 is a sectional view of a mandrel constructed in accordance with the principles of this invention;

FIGURES 2, 3, and 4 are sectional views taken respectively along the lines II—II, III—III, and IV—IV of FIGURE 1;

FIGURE 5 is a fragmentary view showing a portion of the mandrel of FIGURE 1 in horizontal section and a portion of the bar cap on which it is mounted in plan.

While the drawings show a mandrel 1 in the form of a piercing point, it will be understood that the invention is applicable to expanding and reeling mandrels used in the fabrication of seamless steel tubes. As illustrated, the piercing point or mandrel 1 of this invention is hollow and is supported on a tubular mandrel bar 2 by a bar cap 3. The mandrel bar 2 has the customary conventional support (not shown) that provides for its rotation when a tubular blank is being worked over the mandrel 1. The bar cap 3 has an inner end portion 4 which is threaded in the outer end of the mandrel bar 2, and a cylindrical outer end portion 5 on which the inner end 6 of the mandrel 1 has a telescopic fit and is rotatably supported. The end portion 5 is undercut at 7 to provide space for the reception of a cylindrical skirt 8 at the inner end of a tubular extension 9 which has an axially extending opening 10 for a purpose to be described and is secured to the bar cap 3 by a welded connection 11 at the inner edge of the skirt 8. The connection 11 is machined flush with the cylindrical surface 13 on the bar cap end portion 5 and skirt 8. A pair of axially spaced flanges 14 and 15 projecting radially inwardly from the inner end 6 of the mandrel 1 have bearing engagement against the cylindrical surface 13 and furnish a rotational support for the mandrel 1 on the bar cap end portion 5. The space 16 between the flanges 14 and 15 is used as a manifold through which cooling water is exhausted in a manner to be described.

Facing surfaces 17 and 18 on the mandrel 1 and extension 9 define an annular chamber 20 through which cooling water is circulated from a water supply pipe 21, which is arranged concentrically in the mandrel bar 2 and an axially extending bore 22 in the bar cap 3. The bore 22 has its inner end 23 spaced from the outer end of the bar cap end portion 5 and the water pipe 21 is supported concentrically therein by washers 24 and 25. The washer 24 is received in an enlargement 26 at the outer end of the bore 22 and has openings 27 therein for the circulation of water from an annular passage 28 about the portion of the pipe 21 in the bore 22 into the annular space 29 about the internal surface of the mandrel bar 2. The washer 24 further operates as a stop for limiting movement of the pipe 21 to the right as viewed in FIGURE 1 beyond a position in which its nozzle or inner end 30 is spaced from the inner end 23 of the bore 22. The spacing of the nozzle end 30 with respect to the inner end 23 of the bore 22 provides a water supply chamber 31 at the inner end of the bore 22. The mounting washer 25 further operates as a closure to prevent the flow of water from the chamber 31 into the annular exhaust passage 28.

As best shown in FIGURE 3, a plurality of radially extending openings 32, preferably three in number as illustrated, through the skirt 8 and end portion 5 provide inlet ports for the admission of cooling water from the supply chamber 31 to the inner end 33 of the annular chamber 20. Water admitted to the chamber 20 in this manner is forced outwardly over the internal surface 17 of the mandrel 1 to its outer end 34. From the outer end 34, the water has a return flow through the axially extending opening 10 in the tubular extension 9. The outer end of the bar cap portion 5 has an enlarged circular recess 35 drilled therein which receives water from the opening 10 and operates as a manifold for delivering the water to a plurality of exhaust ports 36, preferably three in number, which are connected at their inner ends with the exhaust manifold 16 between the mandrel flanges 14 and 15. From the manifold 16, the exhaust water flows through radially extending ports 37 to the annular exhaust passage 28 from which it flows into the annular space 29 about the internal surface of the mandrel bar 2.

As best shown in FIGURES 1 and 2 of the drawings, the mandrel 1 is provided with a plurality of vanes or ribs 38 extending axially and spirally over its internal surface 17. The angular inclination of the ribs 38 is such that, upon rotation of the mandrel 1 in a counter-clockwise direction as viewed in FIGURE 2, they operate as impeller vanes and force the water outwardly to the mandrel end 34 where an axially and inwardly projecting tip 39 directs its flow into the opening 10. In addition to directing the flow of water through the chamber 20, the impeller vanes 38 and tip 39 increase the heat transfer surface area of the mandrel 1 and provide an improved cooling action. As best shown in FIGURES 3 and 5, the exhaust ports 36 similarly have a spiral or axial inclination which renders them effective upon counter-clockwise rotation of the mandrel bar 2 with the tube being worked over the mandrel, as impellers for forcing the water into the exhaust manifold 16.

As indicated above, the inner end 6 of the mandrel 1 has a telescopic fit on the bar cap end portion 5. Spring latches 40 are provided for holding the mandrel 1 in an assembled position on the bar cap end portion 5. Each of the latches 40 comprises a flat leaf spring 41 that has an anchored connection 42 at one end to the bar cap end portion 5 and a detent 43 on its other end. The mandrel 1 is mounted on the bar cap 3 by moving it axially to the left over the extension 9 to the position shown in FIG- URE 1 and, during this movement, the flange 14 cams the springs 41 inwardly so that each detent 43 is moved into a recess 44 in the bar cap 3. As the mandrel 1 moves into its fully assembled position, the springs 41 snap the detents 43 outwardly to the position shown in solid lines in FIGURE 1 in which they are effective to prevent movement of the mandrel 1 to the right and out of its assembled position. The leaf spring 41 is preferably a bi-metal thermal element or strap which will flex inwardly to move the detent 43 to the position shown in dotted lines when it is heated, for example, by interruption of the flow of cooling water through the chamber 31 during a tube working operation, and thus release the mandrel 1 for movement to the right as viewed in FIGURE 1 of the drawings out of its assembled position on the bar cap 3.

In operation, the mandrel is assembled for a tube piercing operation by telescoping the hollow point 1 over the extension 9 and bar cap end portion 5 to the position shown in FIGURE 1. Water is then supplied through the pipe 21 to the chamber 31 for circulation through the inlet ports 32 and outwardly through the annular chamber 20 over the internal surface 17 of the piercing point 1. Its movement through the chamber 20 is impelled by the spiral vanes 38 upon rotation of the mandrel during a tube piercing operation. The return flow of the cooling water to the annular exhaust passage 29 about the internal surface of the mandrel bar 2 takes place through axial opening 10, manifold 35, exhaust ports 36, manifold 16, ports 37, annular passage 28, and openings 27 in the water pipe mounting washer 24. The axial angular inclination of the exhaust ports 36 as explained above renders them effective as impellers upon rotation of the bar 2 to force the return flow of cooling water into the exhaust manifold 16. It will thus be seen that the mandrel of this invention is cooled by the flow of cooling water therethrough and eliminates the need for replacement at the end of each operating pass that is required by solid mandrels.

While one embodiment of my invention has been shown and described it will be apparent that other adaptations and modifications may be made without departing from the scope of the following claims.

I claim:

1. In a mandrel for fabricating seamless tubing, the combination with a tubular mandrel bar and a bar cap secured to its outer end, of a hollow mandrel supported on said mandrel bar by said bar cap, an extension having an axial opening secured to and projecting axially outwardly from said bar cap and cooperating with said hollow mandrel to define an inlet passage for the flow of cooling water over the internal surface of said hollow mandrel, a water supply pipe extending through said mandrel bar for delivering cooling water to said bar cap, said pipe and mandrel bar having spaced surfaces defining an exhaust passage for the removal of cooling water from said bar cap, and means including an inlet port in said bar cap for delivering cooling water from said supply pipe through said inlet passage to the outer end of said mandrel, and means including said axial opening in said tubular extension and an outlet port in said bar cap connecting said axial opening with said exhaust passage for exhausting the cooling water from the forward end of said mandrel into the said exhaust passage.

2. A seamless tube mandrel as defined in claim 1 characterized by said hollow mandrel having a rotatable support at its inner end on said bar cap.

3. A seamless tube mandrel as defined in claim 2 characterized by said mandrel having spirally extending fins on its said internal surface, said fins being effective upon rotation of said mandrel as impellers for forcing the cooling water outwardly through said inlet passage.

4. A seamless tube mandrel as defined in claim 1 characterized by said bar cap having an axially extending cylindrical projection on which the inner end of said mandrel has a telescopic fit, and means including a spring latch means effective upon telescopic movement of said hollow mandrel to an assembled position on said bar cap projection for holding said hollow mandrel against removal from said bar cap.

5. A seamless tube mandrel as defined in claim 4 characterized by said spring latch means comprising a bi-metal thermal strap which moves upon being heated to an inoperative holding position to permit removal of said hollow mandrel from said bar cap projection.

6. A seamless tube mandrel comprising, in combination, a tubular mandrel bar, a bar cap secured to and forming a closure for the outer end of said mandrel bar, said bar cap having an integral mounting part of cylindrical shape projecting therefrom in a direction axially outwardly from said mandrel bar, a hollow mandrel rotatably supported at its inner end on said mounting part, an extension having an axial opening secured to and projecting axially outwardly from said mounting part and cooperating with said hollow mandrel to define an annular chamber about its internal surface for the flow of cooling water to its outer end, said bar cap having an axially and centrally located bore having an inner end spaced from the outer end of said mounting part, a water supply pipe arranged concentrically in said bore and cooperating with said bar cap to provide an annular exhaust passage about its external surface, said supply pipe having an inner end spaced from the said inner end of said bore to provide a water supply chamber at the said inner end of said supply pipe, a solid washer about the said inner end of said supply pipe forming a closure between said supply chamber and said annular exhaust passage, means including an inlet port in said bar cap connecting said supply chamber with said annular chamber for the delivery of water over the internal surface of said mandrel to its outer end, and means including said axial opening in said tubular extension and an outlet port in said bar cap connecting said axial opening with said exhaust passage for exhausting cooling water from the outer end of said annular chamber into said annular exhaust passage.

7. A mandrel as defined in claim 6 characterized by said bar cap having a plurality of said outlet ports for exhausting cooling water into said annular exhaust passage, and by said cooling water exhaust means further including a plurality of exhaust ports in said mounting part connecting said axial opening with said outlet ports, each of said exhaust ports having an angular inclination in an axial direction rendering it effective upon rotation of said mandrel bar to impel the exhaust flow of water therethrough.

References Cited in the file of this patent

UNITED STATES PATENTS

| | | |
|---|---|---|
| 809,759 | Toole et al. | Jan. 9, 1906 |
| 1,445,139 | Jenkins | Feb. 13, 1923 |
| 1,950,938 | Dunn et al. | Mar. 13, 1934 |
| 1,951,078 | Wright et al. | Mar. 13, 1934 |
| 2,261,937 | Kelso | Nov. 11, 1941 |